United States Patent [19]

O'Brien et al.

[11] 4,091,136

[45] May 23, 1978

[54] SYNTHETIC CORK-LIKE MATERIAL AND METHOD OF MAKING SAME

[75] Inventors: John C. O'Brien, Clinton, N.J.; Herbert A. Ehrenfreund, Madison, Conn.

[73] Assignee: Shaw Plastics Corporation, Berkeley Heights, N.J.

[21] Appl. No.: 686,730

[22] Filed: May 17, 1976

[51] Int. Cl.$^2$ .......................... B32B 3/26; B32B/5/18
[52] U.S. Cl. .................................. 428/141; 215/348; 215/349; 260/2.5 HA; 260/897 B; 428/310; 428/321; 428/400

[58] Field of Search ............... 428/310, 400, 313, 321, 428/315, 64, 66; 260/897 B, 2.5 HA; 215/40, 348, 349; 264/43

[56] References Cited

U.S. PATENT DOCUMENTS

| B 373,354 | 1/1976 | Bocks et al. ........................ 428/315 |
|---|---|---|
| 3,755,208 | 8/1973 | Ehrenfreund ......................... 264/53 |
| 3,979,540 | 9/1973 | Moffett ................................ 428/315 |

Primary Examiner—William J. Van Balen
Attorney, Agent, or Firm—Chapin, Neal and Dempsey

[57] ABSTRACT

A synthetic cork-like material for use as a closure for liquid containers which is composed of a fine celled polyolefin foam containing an ionomer and which may be formed by a foaming process.

4 Claims, No Drawings

SYNTHETIC CORK-LIKE MATERIAL AND METHOD OF MAKING SAME

BACKGROUND

The present invention relates to bottle stoppers and the like. More particularly, it relates to a synthetic cork-like material which may be employed as a bottle stopper or sealing gasket for a liquid container.

Traditionally, bottle stoppers or closures in general and wine bottle stoppers in particular have been produced from a natural material known as "barkcork" or simply "cork".

Many of the mechanical properties of cork, such as its density and compressive strength and modulus of elasticity, have made it the preferred bottle closure, particularly for fine wines where tradition and the wine mystique militates against the use of any substitute for natural cork which is invariably removed with a corkscrew in a bottle opening ritual. Despite its advantages as a bottle closure, natural cork has a tendency to flake and/or crumble in use and tends to deteriorate in extremely wet or dry environments. These drawbacks and its somewhat limited availability have resulted in a search for a suitable cork substitute.

Accordingly, it is an object of the present invention to provide a synthetic material which will act as a substitute for cork as a bottle stopper or gasket and will satisfy the aesthetic requirement of a genuine cork stopper.

It is another object of the present invention to provide a synthetic cork material which approaches many of the physical properties of natural cork when employed as a closure for a liquid container.

It is another object of the present invention to provide a method of making a synthetic cork-like material that may be employed as a wine bottle stopper and is removable by using an ordinary corkscrew.

It is a further object of the present invention to provide a synthetic material that may be used as a cork substitute in existing wine bottling equipment without modification of said equipment.

The above objects and advantages as well as others will become readily apparent when considered in view of the following disclosure.

The basic synthetic material of the instant invention may be described as an ionomer modified polyolefin foam which is essentially closed cell in structure.

The polyolefin used in the present invention is preferably a low density polyethylene or a polypropylene resin which during extrusion with proper additives will form a fine, closed cell foam. Typically, preferred low density polyethylene resins have a melt index of from 2 to 15 and a density of from about 0.910 to 0.935 gm/cc and are present in the foamable mixture in amounts by weight of from about 60 to 98%.

The ionomer resins employed in the basic foamable mixture are derived from ethylene/methacrylic acid copolymers and are ionically cross-linked. They are generally known as "Surlyn" ionomers (a registered trademark of DuPont Co.). Such resins are quite compatible with polyolefin and may be used in amounts of from 0.5 to 35% by weight.

In addition to the basic resins mentioned above, the foamable mixtures employed to make the synthetic cork-like material of the present invention also include a suitable nucleating agent and chemical blowing agent and may also include various lubricants and dyes to impart a cork-like color to the synthetic foam product.

In producing the synthetic cork-like material of the present invention, appropriate amounts of polyolefin and ionomer are mixed along with a chemical blowing agent and suitable other additives. Once thoroughly mixed, the mixture is extruded into cylindrical rod form as a fine, closed cell foam having a density of about 12 to 17 lbs/cu. ft. The extruded cellular rod upon cooling has an outer skin of much higher density than the interior of the extrusion. While this is typical of extruded foams, it is unsuitable for bottle stoppers embodying this invention because of its tendency to wrinkle and form longitudinal channels in the outer surface of the foam rod when the rod is compressed by the bottling or corking equipment and inserted into the neck of a bottle. Conventional corking equipment utilizes a chuck-like gripper which compresses the circumference of the natural cork with a force of about 220 lbs. The diameter of the cork is reduced by such equipment from approximately 15/16 of an inch to about 11/16 of an inch for insertion into a bottle. The surface channels or wrinkles caused by the corking equipment in the high density skin tend to remain therein, since the stoppers are substantially compressed in the bottles. As a consequence, these channels were found to provide leakage paths for the liquid contents of the bottle.

In accordance with this invention, the high density skin of the cylindrical polyolefin stopper is removed by a shaving or abrading operation. As a consequence of this operation, the resulting foam rod is characterized as essentially of uniform density throughout its entire cross section. Subsequent to the removal of the high density skin, the foam rod may be cut into suitable lengths, such as 1½-2 inches and the ends thereof chamfered, whereupon the rod takes on the appearance of a natural cork bottle stopper.

The outer surface of the synthetic cylindrical stopper upon removal of the high density skin has a slightly textured or matte surface characteristic of a fine celled granular material. In accordance with the invention, the outer surface is coated with a substance having a substantially higher coefficient of friction than the foam per se. By the application of a somewhat adhesive or tacky film, the surface characteristics of the polyolefin cork are modified, particularly as to its coefficient of friction. As a result when such a stopper is inserted into a bottle it will remain in sealing relation in the neck of the bottle during shipment, storage and handling in much the same manner as a natural cork stopper. Furthermore, the adhesive or tacky film enables the closure stopper to frictionally grip the glass inner surface of the bottle neck whereby it will not rotate or move axially relative to the glass under the axial and rotational forces which are exerted by a corkscrew in removal of the stopper. A polyolefin stopper, uncoated with such a friction coat, is characterized by so low a coefficient of friction as to be unsuitable for use in corking wine bottles. Indeed, such untreated stoppers have a marked tendency to be sucked into the bottle after the corking operation as a consequence of the reduced pressure within the bottle. Furthermore, attempts to use a corkscrew on such uncoated polyolefin stoppers result in the cork either being pushed axially into the bottle by the corkscrew or by the cork being rotated by the corkscrew as it is turned.

To provide a friction coat in accordance with this invention, the coating material must be one which is insoluble in the liquid contents of the bottle to be sealed. It is also essential that the coating material be nontoxic and suitable for use in contact with foodstuffs, and preferably one which has been approved for such use by the FDA. One suitable material for providing a friction coat on the surface of the polyolefin stoppers is bees wax or a combination of bees wax and parafin. The parafin utilized is preferably one used in preserving foodstuffs and bees wax may be combined therewith in varying amounts. It has been found that by combining 10–30% by weight of bees wax with 70–90% parafin that an entirely suitable coating film will be obtained. These materials are melted and blended together at a temperature of about 200° F. This adhesive or tacky coating material may be applied to the outer surface of the foam in liquid form by spraying, dipping or rolling thereon. One convenient method of application is to melt the adhesive composition and dip the stoppers in the melt. Upon removal of the stoppers from the melt, the excess liquid is removed by using a suitable procedure, such as draining or tumbling, for example, to provide an overall tacky film of about 0.5 gram. The coating material is allowed to cool and solidify to form an overall tacky coating, and while some of the surface pores of the foam are filled, the resulting film is not a leveling coat. Indeed, the cellular or matte surface of the foam provides an excellent base onto which the film can attach or anchor itself mechanically. The tacky film thus applied not only eliminates the problem of cork slippage caused by bottle vacuum but also overcomes slippage during uncorking of the bottle using a conventional corkscrew. Moreover, the insoluble character of the parafin and bees wax film enhances the liquid sealing properties of the stopper at the glass-stopper interface.

The polyolefin foam embodying this invention is modified with sufficient ionomers which may vary from 0.5–20% by weight of the mixture, so that the polyolefin foam will possess sufficient structural strength to be handled in conventional corking equipment without rupture and loss of surface integrity. Additionally, the ionomer provides a bottle closure material which has sufficient cohesive and tensile strength so that a conventional corkscrew can be used to extract the cork from the neck of a bottle at a force of up to about 90 lbs. without breaking the cork. The cork must also have sufficient elasticity and liquid sealing properties after removal, so that it may be reused to reseal the bottle if any of its contents remain after the bottle has been opened for the first time.

It is also essential that the cork substitute embodying this invention possess sufficient elasticity so that it will exert an outward radial pressure on the inner surface of the bottle neck in which it is sealingly engaged of at least about 20 lbs. whereby the closure will remain in positive sealing relation in the bottle even after extended storage periods.

The closures embodying this invention are capable of withstanding the compressive forces of conventional corking equipment which exert a force of about 220 lbs. to compress the cork stopper for inserting into bottle necks. The machine substantially compresses the cork for insertion in a bottle wherein it remains in substantial compression. The sealing forces within the neck of the bottle for natural cork have been found to vary from 110 lbs. to 20 lbs. depending upon the time duration of the sealing and ambient temperatures. The synthetic cork embodying this invention exerts sealing force in the range of 120 lbs. to 30 lbs. The force required to pull the stopper from a bottle varies from 45 to 80 lbs. for natural cork and from 50 to 90 lbs. for the stopper embodying this invention.

While this invention is particularly adapted for wine bottle stoppers of cylindrical configuration which require a corkscrew for removal, it is also suitable for use in stoppers having a flanged cap. Such capped stoppers can be removed conveniently by hand and are used on various liquid containers, including many alcoholic beverages. In this application, it is not as essential to use an adhesive or friction coating since the cap will prevent the stopper being sucked into the bottle. Moreover, all the problems incident to using a corkscrew are not to be contended with.

Furthermore, the material embodying the invention may be formed as stoppers by injection molding or in sheet or block form and die cut to form rods whereby the skining operation is rendered unnecessary. Alternatively, a relatively thin foam sheet may be formed and die cut into thin sealing discs or wafers for use as the sealing washer in crown cap type closures. In this application, the friction coating may not be required except insofar as it enhances the liquid sealing properties of the polyolefin foam per se.

The following is an example of a method of preparation of the synthetic cork material of the present invention.

EXAMPLE I

A mixture of 20 lbs. (9.6 kg) of polyethylene with a melt index of 3.5 and a density of 0.918 (Chemplex 1013 from Chemplex Corp.) was tumbled with 90 grams of magnesium silicate, 60 grams of an ozodecarbonoxide blowing agent (Celogen OT from Naugatuck Chemicals), 90 grams of ionomer (Surlyn 1801 from DuPont Company) and 60 grams of a color concentrate to simulate cork color.

After the rod was cut to length and chamfered as previously described, the foam stoppers were dipped into a melt consisting of a mixture of parafin wax and 10 to 30% bees wax. The corks were removed, allowed to dry and found to have a weight deposit of coating material of 0.5 grams per rod.

EXAMPLE II

The synthetic cork material of Example I was compared with natural cork plugs for sealing efficiency in necked glass bottles. The results are as follows:

|  | Product of Example I | Natural Cork |
|---|---|---|
| Compression strength (lbs.) | 230 | 220 |
| Recovery from compression (%) |  |  |
| 1 month | 85 | 97 |
| 1 hour | 97 | 97.5 |
| 2 hours | 97 | 97.5 |
| Sealing force in neck of bottle (lbs.) |  |  |
| Immediate | 100–120 | 100–110 |
| After 24 hours at 72° F | 60–65 | 55–60 |
| After 1 month at 72° F | 60–65 | 60–70 |
| After 24 hours at 40° F | 55–65 | 55–65 |
| After 1 month at 40° F | 55–65 | 55–65 |
| After 4 hours at 120° F | 30–45 | 20–40 |
| After 8 hours at 120° F | 30–45 | 20–40 |
| Force to remove plug from bottle (lbs.) |  |  |
| After 24 hours at 72° F | 50–65 | 45–70 |
| After 1 month at 72° F | 45–65 | 55–70 |
| After 24 hours at 40° F | 70–90 | 55–80 |
| After 1 month at 40° F | 70–90 | 55–80 |

As will be noted from the above, the synthetic cork material of the present invention is quite similar in sealing and plugging qualities to that of natural cork.

EXAMPLE III

In order to demonstrate the effect of the ionomer component of the formulation, a formulation identical to that given in Example I but without ionomer was prepared and a product extruded under the same conditions as that given in Example I. After abrading the surface of the product as described, the product was tested as a bottle plug and found to be unsatisfactory in that it was not able to contain gas or liquid in the plugged bottle.

EXAMPLE IV

The formulation of Example I with the exception of the Celogen OT blowing agent was processed in accordance with the procedure of Example I. The resultant product was a large celled foam which had unacceptable bottle sealing qualities.

EXAMPLES V-VII

The following formulations were processed in accordance with the teachings of Example I and each formulation resulted in a synthetic cork product which was the operating equivalent of the product of Example I:

| A. | DYNF - 1 (LDPE from Union Carbide) | 20 lbs. |
|---|---|---|
| | Mistron ZCS (50/50 Magnesium silicate/ zinc silicate | 90 grams |
| | Surlyn 1801 (Ionomer resin from DuPont) | 90 grams |
| | Celogen OT - (blowing agent) | 60 grams |
| | Coloring agent | 60 grams |
| B. | DYNF - 1 | 15 lbs. |
| | Microcell E (Calcium Silicate Nucleation System from Johns-Manville Co.) | 25 grams |
| | Surlyn 1801 | 5 lbs. |
| | Celogen OT | 40 grams |
| | Brown and Yellow color | 60 grams |
| C. | DYNF - 1 | 13 lbs. |

-continued

| Microcell E | 25 grams |
|---|---|
| Surlyn 1801 | 7 lbs. |
| Celogen OT | 40 grams |
| Brown and Yellow color | 60 grams |

An alternative method of manufacturing the product of the present invention may be accomplished by slab foaming techniques. In this method of manufacture, the basic synthetic cork mixture is foamed in slab fashion to a desired thickness. Subsequent to cooling of the foam slab, cylindrical sections are cut or die punched therefrom. These sections may be employed directly as bottle stoppers or they may be further treated with a wax coating for enhanced sealing properties.

Having disclosed the invention, what is claimed is:

1. Synthetic cork-like stoppers for liquid containers comprising a fine closed cell foam produced by extrusion in rod form of a foamable mixture of polyolefin and a foaming agent together with an ethylene/methacrylic acid copolymer based ionomer resin, the resulting ionomer modified foam rod having a matte outer surface and a substantially uniform density throughout its cross section of from 12 lbs/cu.ft. to 17 lbs/cu.ft. and a non-leveling coating of moisture impervious material impregnating said matte surface, said material having a substantially higher coefficient of friction than the surface of the foam per se.

2. Synthetic cork-like stoppers for liquid containers as set forth in claim 1 in which said polyolefin is a low density polyethylene from about 60 to 98% by weight of said mixture and said ionomer is present from about 0.5 to 35% by weight of said mixture.

3. Synthetic cork-like stoppers for liquid containers as set forth in claim 2 wherein said coating material includes bees wax.

4. Synthetic cork-like stoppers for liquid containers as set forth in claim 2 wherein said coating material comprises 10 to 30% by weight bees wax and 70 to 90% parafin.

* * * * *